(12) United States Patent
Lin

(10) Patent No.: US 10,517,265 B2
(45) Date of Patent: Dec. 31, 2019

(54) ADJUSTABLE SUPPORTING FRAME AND CANOPY STRUCTURE OF PET STROLLER

(71) Applicant: Yi-Chung Lin, New Taipei (TW)

(72) Inventor: Yi-Chung Lin, New Taipei (TW)

(*) Notice: Subject to any disclaimer, the term of this patent is extended or adjusted under 35 U.S.C. 154(b) by 203 days.

(21) Appl. No.: 15/801,289

(22) Filed: Nov. 1, 2017

(65) Prior Publication Data

US 2019/0053462 A1 Feb. 21, 2019

(30) Foreign Application Priority Data

Aug. 18, 2017 (TW) .................................. 106128126

(51) Int. Cl.
| | | |
|---|---|---|
| *A01K 1/02* | (2006.01) | |
| *A01K 31/07* | (2006.01) | |
| *B62B 3/00* | (2006.01) | |
| *B62B 3/02* | (2006.01) | |

(52) U.S. Cl.
CPC .............. *A01K 1/0236* (2013.01); *B62B 3/02* (2013.01); *A01K 31/07* (2013.01); *B62B 2202/42* (2013.01)

(58) Field of Classification Search
CPC .. A01K 1/0236; A01K 1/0245; A01K 1/0254; A01K 31/07; B62B 2202/42; B62B 3/00; B62B 7/00; B62B 9/00; B62B 3/02
USPC ....... 119/770, 496, 453, 482, 497, 499, 498; 280/47.38
See application file for complete search history.

(56) References Cited

U.S. PATENT DOCUMENTS

| | | | | |
|---|---|---|---|---|
| 6,786,181 B1* | 9/2004 | Leanheart | ............ | A01K 1/0236 119/453 |
| 7,090,242 B1* | 8/2006 | Sheinall | ............... | A01K 1/0236 119/496 |
| 7,261,060 B1* | 8/2007 | Garofola | ............. | A01K 1/0236 119/482 |
| 7,568,450 B2* | 8/2009 | Chen | .................... | A01K 1/0236 119/453 |
| 8,714,111 B2* | 5/2014 | Bryson | ............... | A01K 1/0254 119/453 |
| 9,517,791 B1* | 12/2016 | Hawk | ....................... | B62B 9/26 |
| 2004/0065270 A1* | 4/2004 | King | .................... | A01K 1/0236 119/496 |

(Continued)

*Primary Examiner* — Yvonne R Abbott-Lewis
(74) *Attorney, Agent, or Firm* — Raymond Y. Chan; David and Raymond Patent Firm

(57) ABSTRACT

A pet stroller with an adjustable structure of strut and canopy includes a pet stroller body, an adjustable supporting frame and an adjustable canopy. The adjustable supporting frame includes two rotation shaft boxes respectively arranged on the inner sides of the folding brace of the two sides of the pet stroller body. Each rotation shaft box includes a canopy strut extended diagonally upwards from the front end thereof and a front window strut extended forward parallelly from the front end thereof. The adjustable canopy covers on the external side of the pet stroller body and corresponds to the adjustable supporting frame, so as to allow the adjustable canopy to be transformed among a covering mode, a front opening mode, and a full-opening mode through adjusting the positions of the canopy strut and the front window strut. Accordingly, the overall structure not only becomes more suitable for old large-sized dogs with difficulty of moving, but also enhances the convenience of use for the pets and the pet owners.

10 Claims, 8 Drawing Sheets

(56) References Cited

U.S. PATENT DOCUMENTS

| | | | |
|---|---|---|---|
| 2005/0166861 A1* | 8/2005 | King | A01K 1/0236 119/496 |
| 2006/0169218 A1* | 8/2006 | Chang | A01K 1/0236 119/496 |
| 2014/0230747 A1* | 8/2014 | Jakubowski | B62B 9/14 119/496 |
| 2018/0022371 A1* | 1/2018 | Jakubowski | B62B 5/0013 280/641 |
| 2018/0132446 A1* | 5/2018 | Jakubowski | A01K 1/0236 |
| 2019/0002007 A1* | 1/2019 | Xiang | B62B 9/12 |

* cited by examiner

ADJUSTABLE SUPPORTING FRAME AND CANOPY STRUCTURE OF PET STROLLER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an adjustable supporting frame and canopy structure of pet stroller, and more particularly to an adjustable supporting frame and canopy structure of pet stroller that allows repaid transformation among various utility modes of the canopy, which makes its overall structure being more suitable for older large-sized pet dogs and those with difficulty of moving, so as to improve the convenience in use of the adjustable supporting frame and canopy structure of the pet stroller for the pets and the pet owners.

Description of Related Arts

Nowadays, it is a trend of declining birth rate, increasing celibatarian, and DINKs and more and more people like to raise pets. Both families of celibatarians and married people raise pets to enliven their lives. Some studies show that raising a pet helps for both physical and mental well beings. Among numerous pets, dog is the most popular pet not only because dog can relieve its owner's pressure, but also because dog is the most loyal friend of human being. Therefore, loving people usually take care of their dogs like taking care of their own kids, and often walk them in the public places where dogs are allowed.

Besides using leash to walk a dog, the pet stroller is most commonly used for walking a dog. For dogs with various sizes, there are pet strollers of different sizes correspondingly, so as to have dogs of various sizes to rest in the pet strollers either sitting or lying down safely and steadily and provide them the most comfortable outing and walking circumstance.

Most large-sized pet dogs are the favor and priority of many pet owners because of their mild temper and stability. Relatively, walking large pet dogs requires larger pet strollers. Although the current large pet strollers available in the current market are feasible for large-sized pet dogs, these pet strollers become less feasible to those older medium and large-sized pet dogs since they become more difficulty to move and turn around in the pet strollers. As a result, it can often be found that old medium- and large-sized dogs have a hard time to enter their pet strollers, which leads to inconvenience to the pets and their owners.

Hence, there is a need in the market to create a more feasible pet stroller for older medium and large-sized pet dogs. It would be more convenience to the older medium and large-sized pet dogs if the canopy structure of the pet stroller is able to be rapidly transformed among a covering mode, a front opening mode, and a full-opening mode, so as to not only avoid the pet dogs from jumping out of the pet stroller, but also make it more convenient for pet dogs with difficulty of moving to hop on and off, that can improve the overall utility and convenience thereof.

SUMMARY OF THE PRESENT INVENTION

An object of the present invention is to provide an adjustable supporting frame and canopy structure of a pet stroller that allows the pet stroller to be selectively transformed into a covering mode, a front opening mode, or a full-opening mode mainly by means of an adjustable supporting frame and an adjustable canopy, which is not only suitable for normal medium and large-sized dogs to use, but also more suitable for older medium and large-sized dogs with difficulty of moving to use, so as to enhance the overall utility and convenience of the pet stroller.

In order to achieve the above object, the present invention provides a pet stroller with an adjustable supporting frame and canopy structure, which comprises a pet stroller body, an adjustable supporting frame and an adjustable canopy. The pet stroller body has a frame shaped chassis rack.

The frame shaped chassis rack comprises a rear frame arranged on the back side thereof, a folding brace respectively diagonally arranged on the two sides of the frame shaped chassis rack and the rear frame, a stroller grip extendedly arranged on the top of the rear frame, a base plate arranged on the frame shaped chassis rack, two steering wheels respectively arranged on the two sides of the front end of the frame shaped chassis rack, and two wheels respectively arranged on the two sides of the back end thereof.

The adjustable supporting frame comprises two rotation shaft boxes respectively arranged on inner sides of the folding brace of the two sides of the pet stroller body. Each rotation shaft box is connected with the frame shaped chassis rack and the rear frame respectively through two props. The rotation shaft box comprises a canopy strut extended diagonally upwards from the front end thereof and a front window strut extended forward parallelly from the front end thereof. The front window strut has two sliding sleeves respectively arranged on the two sides thereof. Each sliding sleeve is connected to the frame shaped chassis rack through a prop.

The adjustable canopy covers on an external side of the pet stroller body and corresponds to the adjustable supporting frame, so as to allow the adjustable canopy to be switched among a covering mode, a front opening mode, and a full-opening mode through adjusting positions of the canopy strut and the front window strut.

In a preferred embodiment, when the adjustable canopy is in the covering mode, the canopy strut is extended diagonally forward and the front window strut is extended forward and parallel to the frame shaped chassis rack. When the adjustable canopy is in the front opening mode, the canopy strut is extended diagonally forward and the front window strut is upwardly turned and parallel to the canopy strut, so as to form an opening at the front of the adjustable canopy. When the adjustable canopy is in the full-opening mode, the canopy strut is backwardly turned and leant against the rotation shaft box and the front window strut is also backwardly turned and leant on the front side of the canopy strut, so as to allow the adjustable canopy to be opened from the front to the back.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
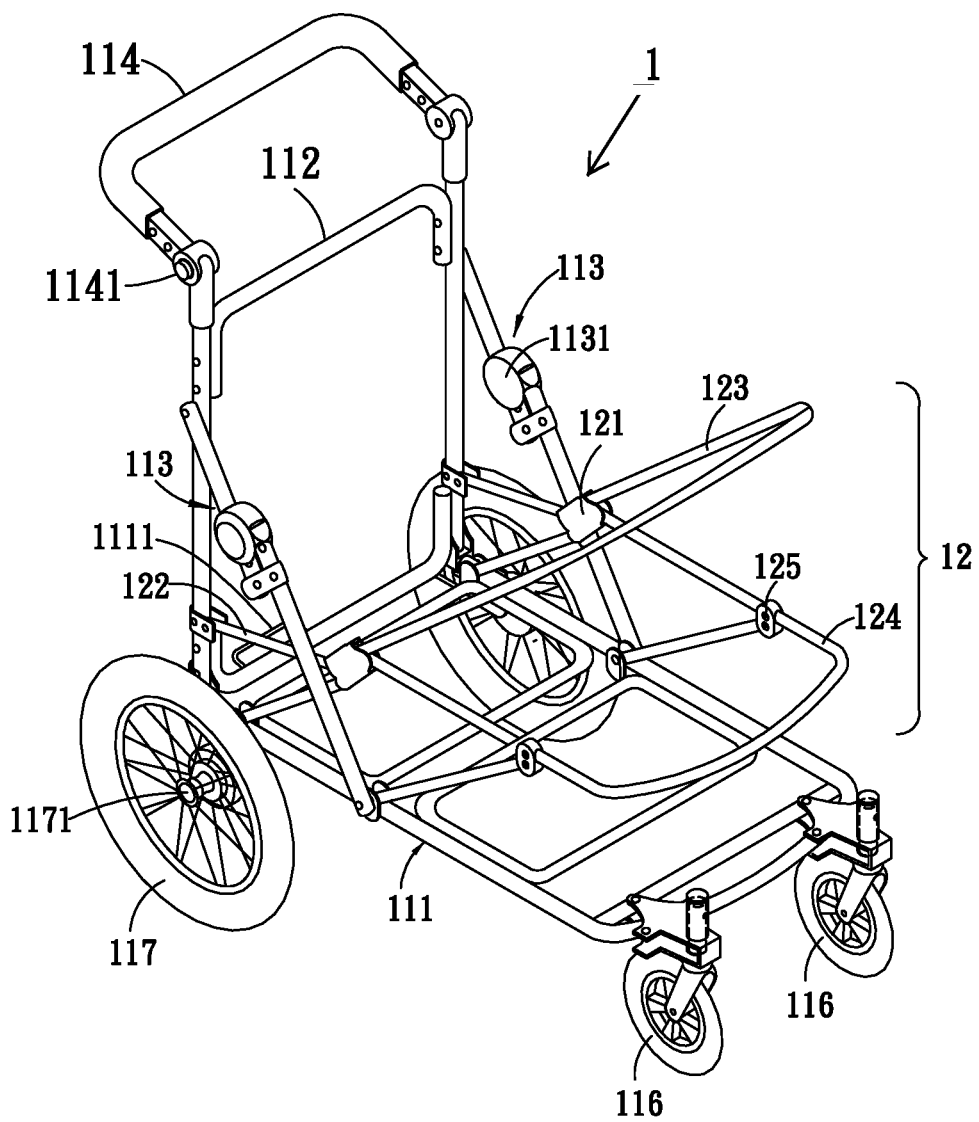
FIG. 1 is a perspective view of an adjustable canopy in an uncovering mode of the adjustable supporting frame and canopy structure of pet stroller according to a preferred embodiment of the present invention.
Figure 2:
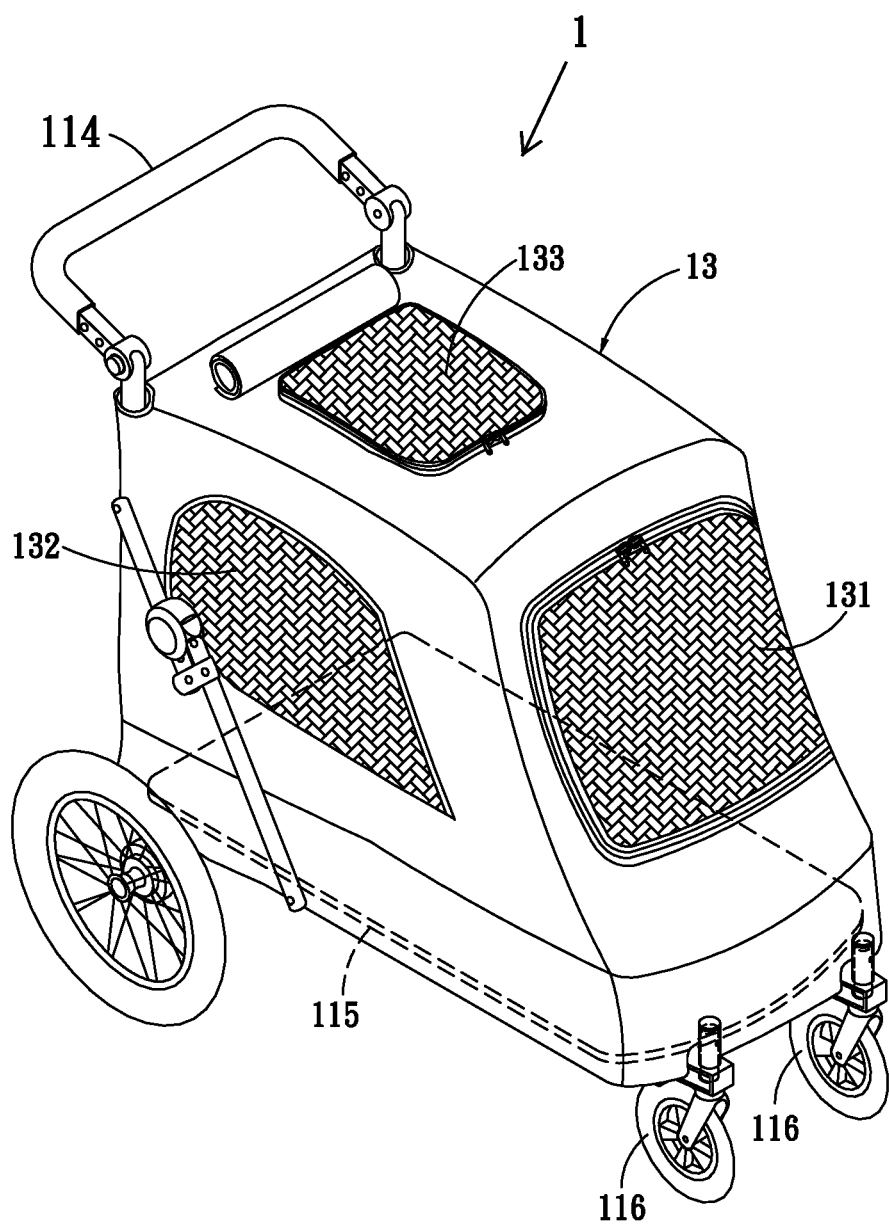
FIG. 2 is a perspective view of the adjustable supporting frame and canopy structure of pet stroller according to the above preferred embodiment of the present invention.

Referring to FIGS. 1 and 2, an adjustable canopy in an uncovering mode of an adjustable supporting frame and canopy structure of pet stroller according to a first preferred embodiment of the present invention is illustrated. As illustrated, according to the first preferred embodiment, the adjustable supporting frame and canopy structure of pet stroller 1, adapted for serving for medium-sized or large-sized pet dogs, comprises a pet stroller body 11, an adjustable supporting frame 12 and an adjustable canopy 13. The pet stroller body 11 comprises a frame shaped chassis rack 111 which comprises a rear frame 112 arranged on a back side thereof, a folding brace 113 respectively diagonally arranged on two sides of the frame shaped chassis rack 111 and the rear frame 112, a stroller grip 114 extendedly arranged on a top of the rear frame 112, a base plate 115 arranged on the frame shaped chassis rack 111, two steering wheels 116 respectively arranged on two sides of a front end of the frame shaped chassis rack 111, and two wheels 117 respectively arranged on two sides of a back end of the frame shaped chassis rack 111.

The adjustable supporting frame 12 comprises two rotation shaft boxes 121 respectively arranged on inner sides of the folding brace 113 of two sides of the pet stroller body 11. Each of the rotation shaft boxes 121 is connected with the frame shaped chassis rack 111 and the rear frame 112 respectively through two props 122. Each of the rotation shaft boxes 121 comprises a canopy strut 123 extended diagonally upwards from a front end thereof and a front window strut 124 extended forwardly and parallelly from the front end thereof. The front window strut 124 has two sliding sleeves 125 respectively arranged on two sides thereof. Each of the sliding sleeves 125 is connected to the frame shaped chassis rack 111 through a prop 122.

The adjustable canopy 13 covers on an external side of the pet stroller body 11 and corresponds to the adjustable supporting frame 12, so as to allow the adjustable canopy 13 to be switched among a covering mode, a front opening mode, and a full-opening mode through adjusting positions of the canopy strut 123 and the front window strut 124.

According to the first preferred embodiment, the folding brace 113 comprises an upper brace, a lower brace, and a folding joint 1131 arranged at the junction of the upper brace and the lower brace. When the folding joint 1131 is in a lock state, the upper brace and the lower brace are remained in a straight fixed mode. When the folding joint is in an open state, the upper brace is allowed to be turned and folded with respect to the lower brace. The stroller grip 114 comprises two adjustment knobs 1141 respectively arranged on a left side and a right side thereof for adjusting an angle (height) of the stroller grip 114. Each of the steering wheels 116 is a demountable steering wheel and has a bushing and a through rod. The through rod is allowed to not only penetrate into the bushing to be positioned, but also be disengaged from the bushing. Each of the wheels 117 comprises a quick release button 1171 arranged on an external side thereof. Pressing the quick release buttons 1171 make the wheel axles of the wheels 117 be disengaged from the rear wheel holes respectively, so as for removing the wheels 117. The frame shaped chassis rack 111 further comprises a brake pedal lever 1111 arranged on the back thereof for fixing the wheels 117 on the two sides thereof. The adjustable canopy 13 further comprises a front window member 131 provides on the front side thereof, two vent members 132 respectively provides on the two sides thereof, a skylight member 133 provides on the top side thereof, a zipper door sheet arranged on the back thereof, and a carriage bag provides on the zipper door sheet.

Figure 3A:
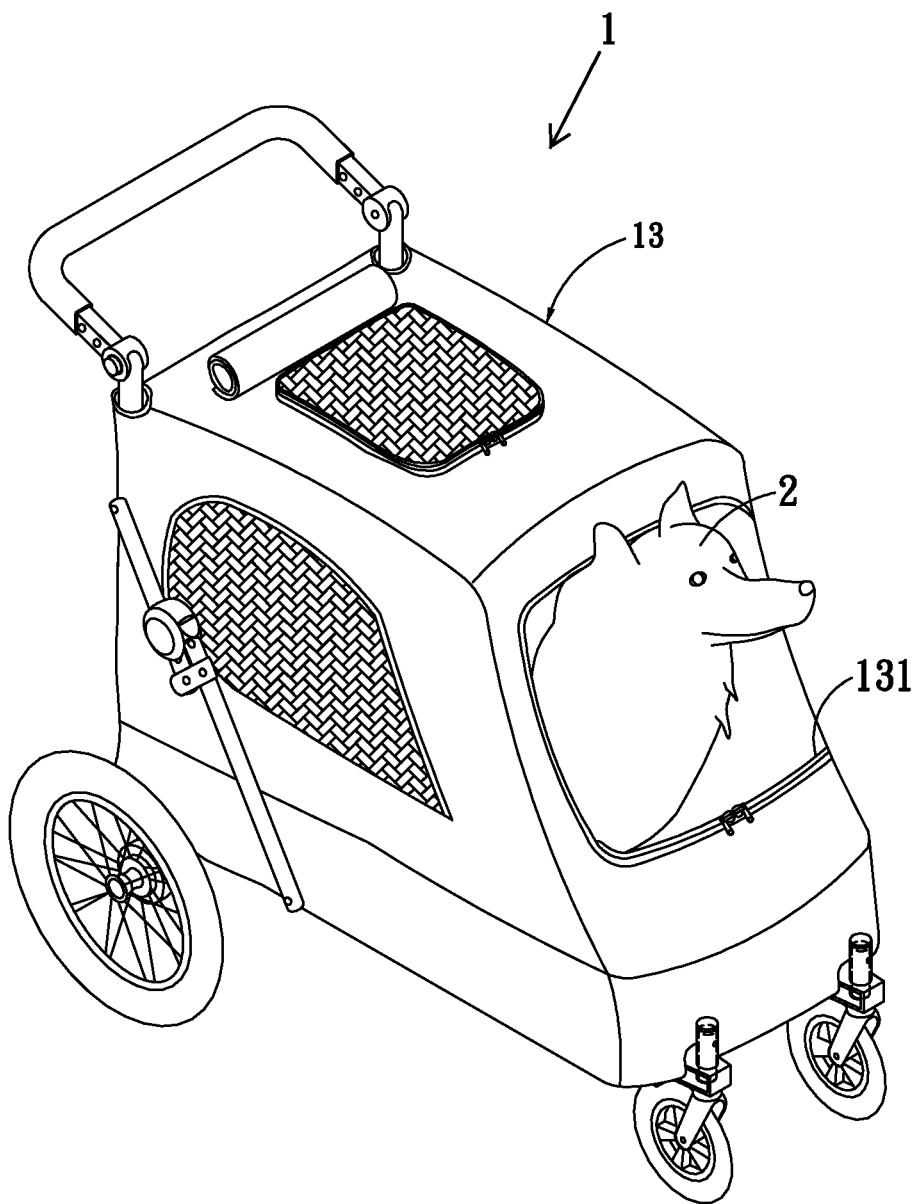
FIG. 3A is a perspective view of the adjustable supporting frame and canopy structure of pet stroller in use in a covering mode according to the above preferred embodiment of the present invention.
Figure 3B:
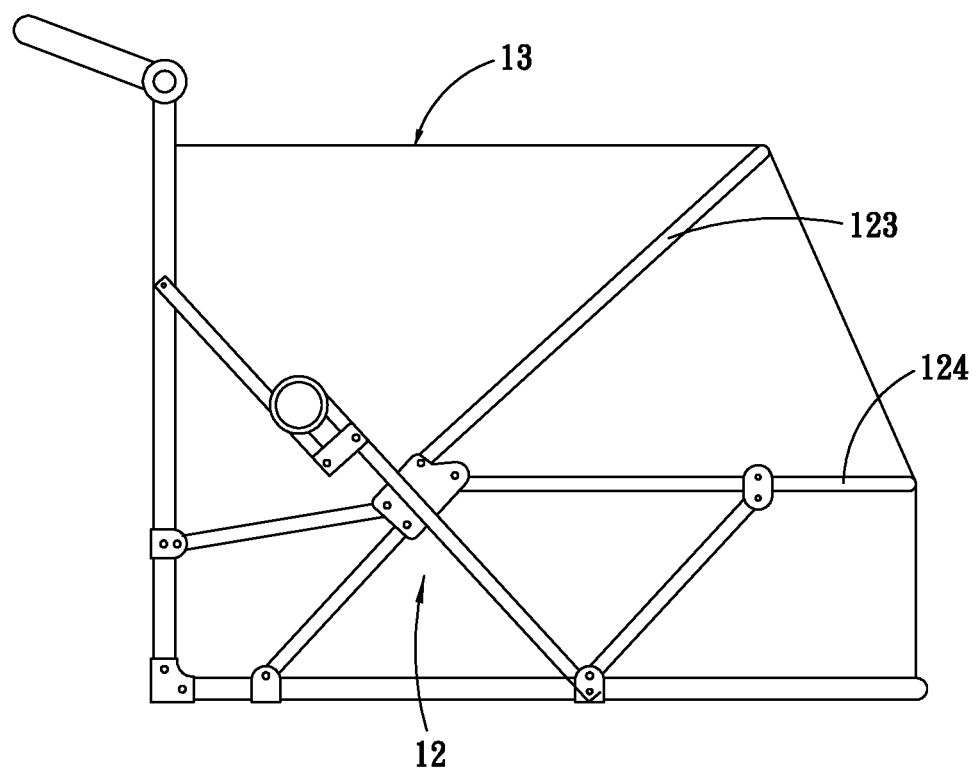
FIG. 3B is a side structural perspective view of the adjustable supporting fame and the adjustable canopy of the adjustable supporting frame and canopy structure of pet stroller in a covering mode according to the above preferred embodiment of the present invention.

FIGS. 3A and 3B are a utility perspective view illustrating the adjustable supporting frame and canopy structure of pet stroller 1 and a structural side view illustrating the adjustable supporting frame 12 and the adjustable canopy 13 of the adjustable supporting frame and canopy structure of pet stroller 1, in use in the covering mode, according to the above preferred embodiment of present invention. As illustrated, when the adjustable supporting frame and canopy structure of pet stroller 1 of the present invention is actually in use, it can be transformed into the covering mode. When the adjustable supporting frame 12 and the adjustable canopy 13 are under the covering mode, the canopy strut 123 is extended diagonally forward and the front window strut 124 is extended forward and parallel to the frame shaped chassis rack 111. At this position, a pet dog 2 can sit in the pet stroller body 11 safely and steadily. This is especially suitable for using in relatively cold weather or rainy days. It not only prevents the pet dog 2 from jumping out of the pet stroller body 11, but also allows the front window 131 on the front side of the adjustable canopy 13 to be opened, so as to let the pet dog 2 putting its head out of the window (as illustrated in FIG. 3A).

Figure 4A:
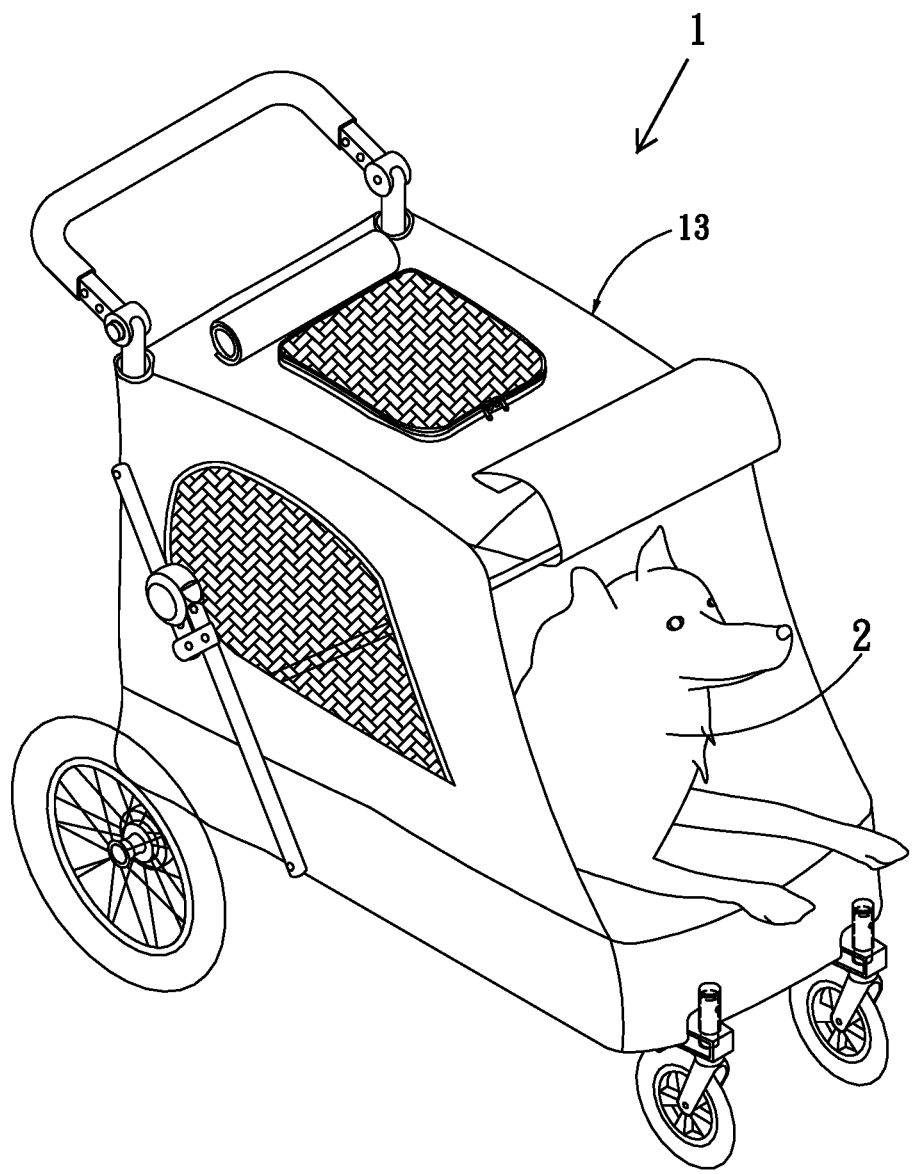
FIG. 4A is a perspective view of the adjustable supporting frame and canopy structure of pet stroller in use in a front opening mode according to the above preferred embodiment of the present invention.
Figure 4B:
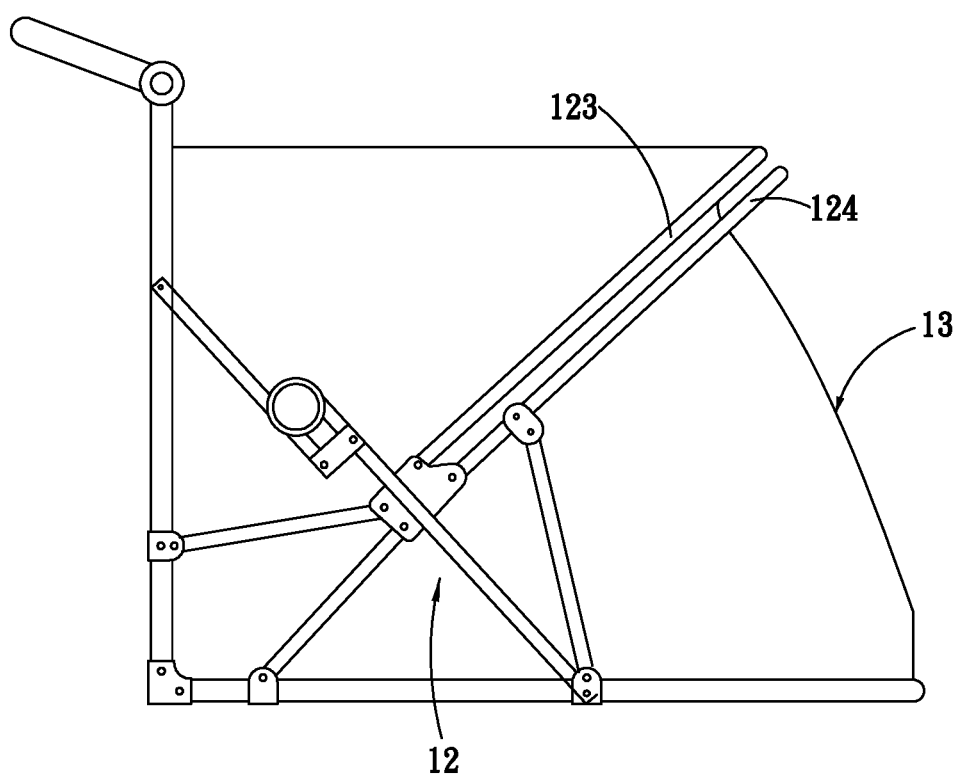
FIG. 4B is a side structural perspective view of the adjustable supporting frame and the adjustable canopy of the adjustable supporting frame and canopy structure of pet stroller in a front opening mode according to the above preferred embodiment of the present invention.

FIGS. 4A and 4B are a utility perspective view illustrating the adjustable supporting frame and canopy structure of pet stroller 1 and a structural side view illustrating the adjustable supporting frame 12 and the adjustable canopy 13 of the adjustable supporting frame and canopy structure of pet stroller 1, in use in the front opening mode, according to the above preferred embodiment of present invention. As illustrated, when the adjustable supporting frame and canopy structure of pet stroller 1 of the present invention is actually in use, it can be transformed into the front opening mode. When the adjustable supporting frame 12 and the adjustable canopy 13 are in the front opening mode, the canopy strut 123 is extended diagonally forward and the front window strut 124 is upwardly turned to the position parallel to the canopy strut 123, such that an opening is formed at the front of the adjustable canopy 13 in the front opening mode that is suitable for sun shading or keeping out drizzle when walking the pet dog 2 (as illustrated in FIG. 4A). Also, an old pet dog 2 with difficulty of turning around may get on the pet stroller from the back and get off the stroller directly via the front opening when the destination is arrived. It not only makes old pet dog 2 more comfortable when using it, but makes it easier for the pet owner too.

Figure 5A:
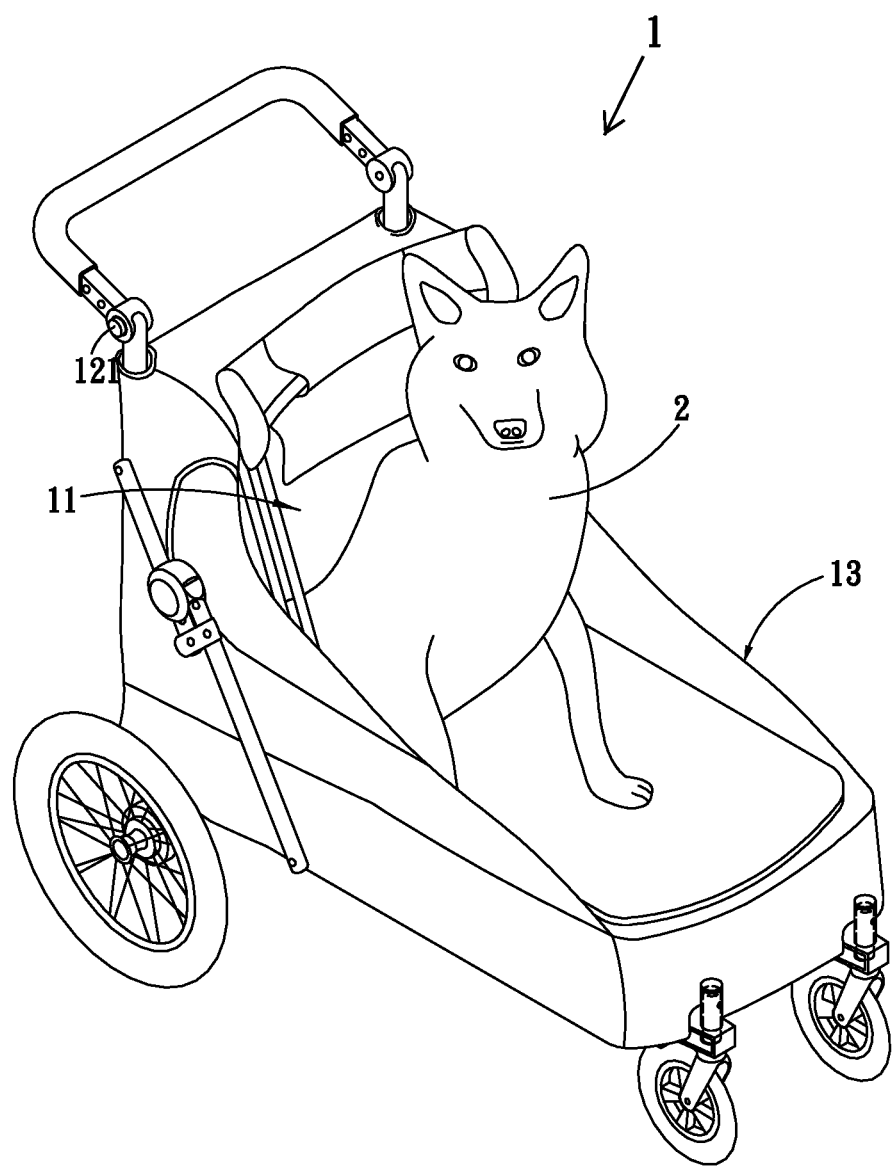
FIG. 5A is a perspective view of the adjustable supporting frame and canopy structure of pet stroller in use in a full-opening mode according to the above preferred embodiment of the present invention.
Figure 5B:
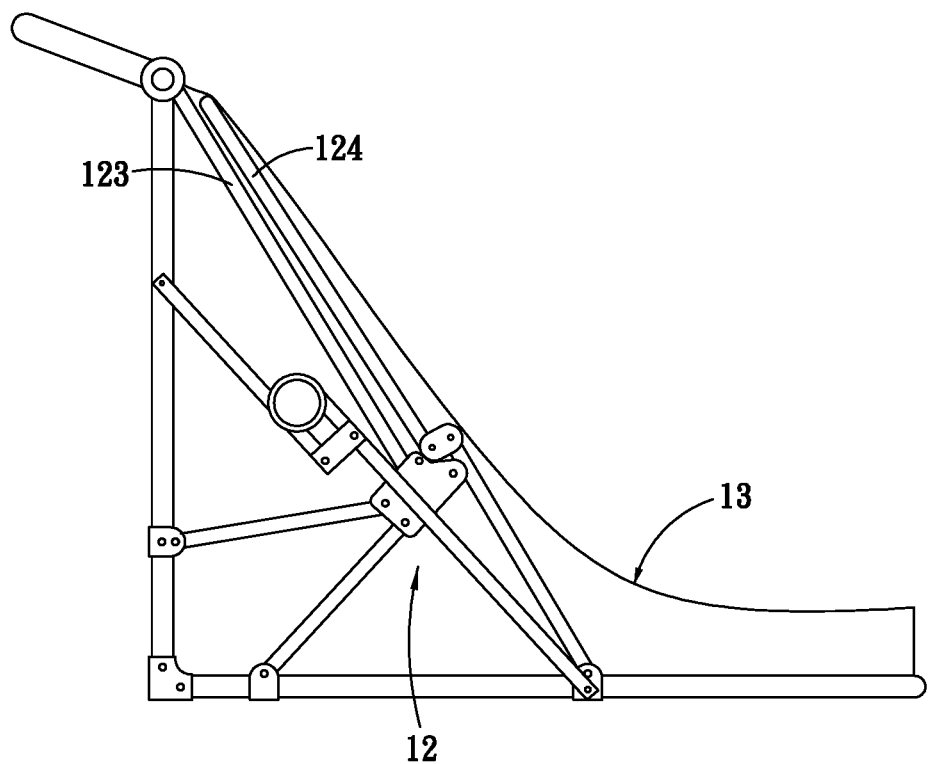
FIG. 5B is a side structural perspective view of the adjustable supporting frame and the adjustable canopy of the adjustable supporting frame and canopy structure of pet stroller in a full-opening mode according to the preferred embodiment of the present invention.

FIGS. 5A and 5B are a utility perspective view illustrating the adjustable supporting frame and canopy structure of pet stroller 1 and a structural side view illustrating the adjustable supporting frame 12 and the adjustable canopy 13 of the adjustable supporting frame and canopy structure of pet stroller 1, in use in full-opening mode, according to the above preferred embodiment of present invention. As illustrated, when the adjustable supporting frame and canopy structure of pet stroller 1 of the present invention is actually in use, it can be transformed into the full-opening mode. When the adjustable supporting frame 12 and the adjustable canopy 13 is in the full-opening mode, the canopy strut 123 and the front window strut 124 are both turned backwards until they are leant against the rotation shaft box 121, such that an enlarged opening is formed in the front of the adjustable canopy 13 in the full-opening mode that is suitable for a pet dog 2 to sit in the pet stroller body 11 for sunbathing and for better ventilating (as illustrated in FIG. 5A). Also, an old pet dog 2 with difficulty of turning around may get on the stroller from the back and get off the stroller directly via the front enlarged opening when the destination is arrived. It not only makes old pet dogs 2 more comfortable when using it, but makes it easier for the pet owner too.

In contrast to the prior art, the main overall structure of the adjustable supporting frame and canopy structure of pet stroller 1 of the present invention is more suitable for medium- and large-sized pet dogs. The pet stroller is not only easy for getting on, but also designed to allow older pet dogs or pet dogs with difficulty of moving or turning around to get in in the back and get off from the front of the pet stroller, such that the pet dog does not have to turn around to get off from the back, which makes dogs more comfortable when using it and helps the pet owner to be more relaxed and relieved. Moreover, the pet stroller provides the covering mode, the front opening mode, and the full-opening mode for the owner to selectively cope with different weather variations or situations by adjusting the opening modes of the adjustable canopy, which enhances the overall utility and convenience.

Although the above descriptions and figures have disclosed preferred embodiment(s) of the present invention, one must understand that there are various additions, modifications, and replacements that may be applied to the preferred embodiment(s) of the present invention without deviating from the spirit and scope of the elements of the present invention defined by the appended claim(s). Person skilled in the art of the present invention should be able to understand that the present invention can be utilized with modifications of various forms, structures, arrangements, ratios, materials, components, and parts. Therefore, the embodiment disclosed in the present specification shall be considered for illustrating the present invention rather than limiting the present invention. The scope of the present invention shall be defined by the appended claim and cover the equivalences rather than be limited in the above descriptions.

One skilled in the art will understand that the embodiment of the present invention as shown in the drawings and described above is exemplary only and not intended to be limiting.

What is claimed is:

1. A pet stroller with an adjustable supporting frame and canopy structure, comprising:
    a pet stroller body comprising a frame shaped chassis rack which comprises a rear frame arranged on a back side thereof, a folding brace respectively diagonally arranged on two sides of said frame shaped chassis rack and said rear frame, a stroller grip extendedly arranged on a top of said rear frame, a base plate arranged on said frame shaped chassis rack, two steering wheels respectively arranged on two sides of a front end of said frame shaped chassis rack, and two wheels respectively arranged on two sides of a back end of said frame shaped chassis rack;
    an adjustable supporting frame comprising two rotation shaft boxes respectively arranged on inner sides of said folding brace of two sides of said pet stroller body, wherein each of said rotation shaft boxes is connected with said frame shaped chassis rack and said rear frame respectively through first and second props, wherein each of said rotation shaft boxes comprises a canopy strut extended diagonally upwards from a front end thereof and a front window strut extended forward parallelly from said front end thereof, wherein said front window strut has two sliding sleeves respectively arranged on two sides thereof, wherein each of said sliding sleeves is connected to said frame shaped chassis rack through a third prop; and
    an adjustable canopy covering on an external side of said pet stroller body and corresponding to said adjustable supporting frame, wherein said adjustable canopy is able to be transformed among a covering mode, a front opening mode and a full-opening mode through adjusting positions of said canopy strut and said front window strut.

2. The pet stroller, as recited in claim 1, wherein said folding brace comprises an upper brace, a lower brace and a folding joint arranged at a junction of said upper brace and said lower brace, wherein when said folding joint is in a lock state, said upper brace and said lower brace are remained in a straight fixed mode, wherein when said folding joint is in an open state, said upper brace is allowed to be turned and folded relatively to said lower brace.

3. The pet stroller, as recited in claim 1, wherein said stroller grip comprises two adjustment knobs arranged on the left side and right side thereof respectively for adjusting an angle and a height of said stroller grip.

4. The pet stroller, as recited in claim 1, wherein when said adjustable canopy is in the covering mode, said canopy strut is extended diagonally forward and said front window strut is extended forward and parallel to said frame shaped chassis rack.

5. The pet stroller, as recited in claim 1, wherein when said adjustable canopy is in the front opening mode, said canopy strut is extended diagonally forward and said front window strut is upwardly turned and parallel to the canopy strut to form an opening at a front of said adjustable canopy.

6. The pet stroller, as recited in claim 1, wherein when said adjustable canopy is in the full-opening mode, said canopy strut is backwardly turned and leant against said rotation shaft box and said front window strut is also backwardly turned and leant on the front side of said canopy strut, so as to allow said adjustable canopy to be opened from the front to the back.

7. The pet stroller, as recited in claim 1, wherein each of said steering wheels is demountable steering wheel and comprises a bushing and a through rod, wherein said through rod is allowed to not only penetrate into said bushing to be positioned, but also to be disengaged from said bushing.

8. The pet stroller, as recited in claim 1, wherein said wheel comprises a quick release button arranged on an external side thereof, wherein pressing said quick release button makes said wheel axle of said wheel be disengaged, so as for removing said wheel.

9. The pet stroller, as recited in claim 1, wherein said frame shaped chassis rack further comprises a brake pedal lever arranged on the back thereof for fixing said wheels on the two sides thereof.

10. The pet stroller, as recited in claim 1, wherein said adjustable canopy comprises a front window unit provided on a front side thereof, two vent units respectively provided on two sides thereof and a skylight unit provided on a top side thereof.

* * * * *